3,685,970
APPARATUS FOR THE ANALYSIS OF FIBROUS CONSTITUENTS IN FEEDS
Kenneth Wilfred Moir, 84 Beverley Hill St., Clifton Hill, Brisbane, Queensland, Australia
Filed Apr. 22, 1970, Ser. No. 30,774
Claims priority, application Australia, Apr. 28, 1969, 54,014/69
Int. Cl. G01n 5/04, 25/14, 33/02
U.S. Cl. 23—253 R
1 Claim

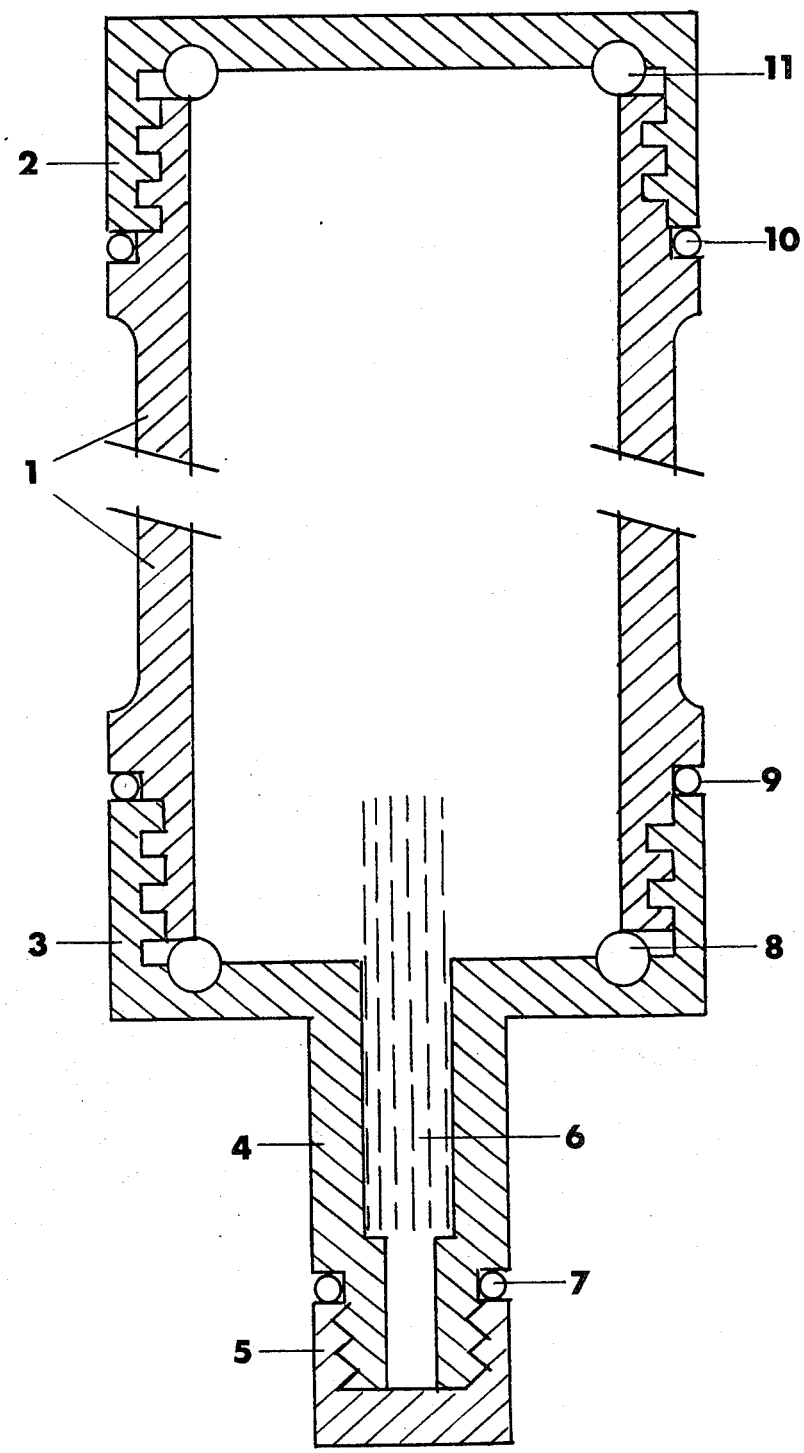

ABSTRACT OF THE DISCLOSURE

Extraction of animal feeds for the purpose of measuring their fibrous constituents is achieved by heating a sample with extractant in a tube closed with screw-on caps in a thermostatically controlled air oven. By these means are avoided variation due to altitude in the boiling point of an extractant and the high heat input which is required to overcome latent heat of evaporation. One of the screw-on caps on the body of the tube is integral with a smaller capped tube extending externally and containing a wick extending internally. Upon removing appropriate caps spent extractant is forced through the wick by pressure leaving behind the fiber residue. The screw-on caps are optionally fitted with external seals to prevent absorption of atmospheric moisture during weighing of the fibrous residue. Otherwise the residue is transferred for weighing and subsequent ashing. The wicks used for filtering are economicaly disposable after each determination.

---

This invention relates to the extraction of feed samples and the filtration and weighing of fibrous residues.

In conventional procedures, feeds are extracted by boiling samples with an extractant for a specified period in vessels fitted with condensers. The attention of the analyst is required during this operation in order to control boiling rates and extraction times. After extraction is complete the fibrous residues are quantitatively transferred to filters. The filtered residues are washed free from extractant and dried in an oven before weighing. Because of their hygroscopic nature fibrous residues must be kept in a desiccator during cooling. The equipment for the simultaneous analysis of a number of feed samples requires considerable bench-space.

The objectives of this invention are to eliminate the need for the analyst's attention during the extraction of feed samples; to reduce the number of manipulations in the analysis and to allow a number of samples to be analysed simultaneously in equipment which occupies relatively little bench-space.

These objectives are achieved by mechanically shaking feed samples in capped tubes in a controlled temperature environment; by incorporating a filter in each tube and by making the tubes sufficiently small so that they can be weighed on an analytical balance. The fibrous residues are kept free from atmospheric effects by capping the tubes after drying.

Embodiments of the invention are illustrated in the figure. Referring to the figure an extraction tube 1 is 12.5 cm. long and 2.5 cm. internal diameter. It is threaded at each end and fitted with a screw-on cap 2. Another similar cap 3 has a smaller tube 4 extending 2.5 cm. externally. This smaller tube has an internal diameter of 7 mm. for half its length and 3 mm. for the other half. It is fitted with a screw-on cap 5. The filter 6 is a cylindrical core of fibres extending 1 cm. into the extraction tube. Water tight seals for the screw-on caps are provided by O rings 7, 8, 9, 10 and 11.

A rack holding six extraction tubes rests on rigid supports and is held in position by guides on a filter stand. The base of the filter stand is a tray which has raised sides of 2 cm. and an outlet tube of 8 mm. internal diameter to which is attached a rubber tube to a sink.

Racks with extraction tubes are placed in a horizontal position between fixed plates and spring loaded plates on shelves in a thermostatically controlled hot air oven. The shelves are pivoted at their centres on supporting columns which are held in position by guides on the inside top of the oven. These supporting columns are mounted on a tray and the whole assembly is easily removable for cleaning. The shelves are moved through an arc of 26° about the horizontal by a crank which passes through a slit in the top of the oven. The crank is attached to a 25 r.p.m. electric motor. Adjacent to this oven is a similar separately controlled oven fitted with fixed drying shelves.

The materials from which the embodiment in the figure are made and the methods of using this embodiment in the analysis of fibrous constituents in feeds will now be described.

All components of the extraction tubes are resistant to chemical attack by the extractants and are free from excessive distortion at the temperatures of operation. Polyethylene has been found suitable. The O rings are Neoprene. The depth of the screw-on caps on the extraction tubes are such that when the inner O rings are compressed 0.5 mm. the external O rings on the extraction tubes are compressed 0.25 mm.

For some analyses cotton wool filters are used. These are made by cutting strips about 7 mm. wide from a roll of cotton wool and fashioning these into cylindrical shapes which after cutting off square with scissors are introduced into the filter holders by lightly tiwsting. With some extractants, glass wood filters are used. These are made by rolling glass wool into cylindrical shapes of such diameter that they must be compressed between the fingers and introduced into the filter holder with a twisting motion. The protruding filters are cut with scissors to leave a wick 1 cm. long.

In the actual analysis of fibrous constituents the tubes containing the filters are dried at 105° C. and after tightly capping they are cooled in air. Before weighing they are wiped with a lint free cloth. The top caps are removed and tubes places in the drying oven. Feed samples are weighed into small wide necked bottles and the samples are transferred to the hot tubes. The extractant which has been heated as close as practicable to the extracting temperature is added immediately to about 1 cm. from the top. After six tubes are filled they are capped and placed in the extraction oven.

After extraction is complete the racks each holding six tubes are placed on the filter stands. The small filter caps are removed with a gloved hand and washed. The top caps are removed and adhering residues are washed back into the tubes. The washed caps are placed on a board with 36 numbered squares and placed in the drying oven.

The extractant is filtered off by placing a large rubber stopper which has a central hole over each tube in turn and applying pressure by a 50 ml. hypodermic syringe. This procedure results in rapid filtration even with samples which are difficult to filter on conventional filters. The residues are washed with hot distilled water by gravity flow, but with samples which are excessively slow to filter, pressure is applied. The tubes and caps removed during filtration are separately dried overnight at 105° C. The caps are replaced immediately on removal of the tubes from the oven.

When a determination of the ash content of fibrous residues is required, all caps are removed and the residues are quantitatively transferred with the aid of a glass rod tipped with rubber and a camel hair brush into weighed silica basins. Ash is determined after ignition at 400° C. for 6 hrs. When a glass wool filter has been used, its weight must be previously determined.

This invention has been used for determining crude fibre, acid detergent fibre and lignin in fodders of low to high fibre contents. For each determination the reagents specified in the original publication were used. References to these publications are:

(i) Crude fibre—Official Methods of Analysis of the Association of Official Agricultural Chemists (1960).

(ii) Acid detergent fibre and lignin—Van Soest, P. J. (1963)—J. Assn. Off. Agric. Chem., 46:829.

As these published methods are empirical it was necessary with this invention to determine extraction temperatures and times so that the results of analyses were comparable to those obtained by the published procedures. The experimental conditions which resulted in similar standard errors and no statistically significant differences between the results obtained by this invention and those obtained by the published procedures were:

What is claimed is:

1. An apparatus for extracting a sample of animal feed, for filtering the fiber residue thereof and for containing said fiber residue therein during weighing, comprising: two tubes, one tube having a greater internal diameter than the other tube and defining an extraction tube and said other tube defining a filtration tube, said extraction tube having a portion at each end thereof of smaller external diameter than that of the immediately adjacent part of said extraction tube, each said portion having external threads one of which has a removably secured cap and the other said portion a similar said removably secured cap integral with said filtration tube extending externally from said extraction tube, said filtration tube having an external thread and a removably secured cap and said filtration tube having means of supporting a wick extending internally into said extraction tube, said extration tube, said filtration tube and said removably secured caps comprising component parts having seals disposed between the internal and external interfaces of the assembly of said component parts.

|  | Crude fibre | Acid detergent Fibre | Lignin [1] |
|---|---|---|---|
| Filter | Cotton wool | Glass wool | Glass wool. |
| Sample weight (g.) | 1.000 | 1.000 | 1.000. |
| Extraction temperature (° C.) | 105 | 105 | 22. |
| Extraction time | 37 minutes [2] | 65 minutes | 3 hours. |

[1] 30 ml. of 72% $H_2SO_4$ were added to the acid detergent fibre in the extraction tubes which were held in a vertical position with the top caps and filter tube caps removed. The acid detergent fibre was mixed with the acid initially and at 45 minute intervals by applying gentle negative pressure with a 50 ml hypodermic syringe.
[2] For both acid and alkali.

References Cited

UNITED STATES PATENTS 3,507,619     4/1970     Hoglund _____ 23—230

MORRIS O. WOLK, Primary Examiner

E. A. KATZ, Assistant Examiner

U.S. Cl. X.R.

23—259, 292, 267 R